United States Patent
Araki

(10) Patent No.: US 9,947,062 B2
(45) Date of Patent: Apr. 17, 2018

(54) IMAGE FORMING APPARATUS AND SOCIAL SECURITY NUMBER REGISTRATION SYSTEM

(71) Applicant: KYOCERA Document Solutions Inc., Osaka (JP)

(72) Inventor: Takashi Araki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/456,739

(22) Filed: Mar. 13, 2017

(65) Prior Publication Data

US 2017/0278211 A1    Sep. 28, 2017

(30) Foreign Application Priority Data

Mar. 25, 2016  (JP) ................................. 2016-061305

(51) Int. Cl.
*G06Q 50/26*  (2012.01)
*G06F 21/60*  (2013.01)
(Continued)

(52) U.S. Cl.
CPC ............. *G06Q 50/26* (2013.01); *G06F 21/30* (2013.01); *G06F 21/608* (2013.01); *G06K 9/00456* (2013.01); *G06Q 30/018* (2013.01); *H04N 1/00331* (2013.01); *H04N 1/32122* (2013.01); *H04N 1/4433* (2013.01); *H04N 2201/0094* (2013.01); *H04N 2201/3283* (2013.01)

(58) Field of Classification Search
CPC .... G06Q 50/26; G06Q 30/018; G06F 21/608; G06F 21/30; H04N 1/00331; H04N 1/32122; H04N 1/4433; H04N 2201/0094; H04N 2201/3283; G06K 9/00456
USPC ....................................................... 358/1.14
See application file for complete search history.

(56) References Cited

U.S. PATENT DOCUMENTS 9,811,728 B2 * 11/2017 King ................... G06K 9/00483
2007/0176000 A1 * 8/2007 Cattrone ................ G06K 1/121
235/462.01
(Continued)

FOREIGN PATENT DOCUMENTS

JP    2009-282811 A    12/2009

*Primary Examiner* — Allen H Nguyen
(74) *Attorney, Agent, or Firm* — Studebaker & Brackett PC

(57) ABSTRACT

An image forming apparatus includes a reading device that reads an image from a document, a storage device, and a central processing unit (CPU). The storage device stores therein an authentication kit, a scan extension kit, and a specific information collection program. The CPU executes the authentication kit to function as an authentication unit, the scan extension kit to function as a character recognition unit, and the specific information collection program to function as a specific information collection unit. The specific information collection unit acquires information of the user for which authentication passes from a user information management system that manages the information of the user. The specific information includes a character that represents a value of a specific item indicated in a specific document as the document and that is recognized by the character recognition unit; and the information of the user acquired from the user information management system.

12 Claims, 14 Drawing Sheets

(51) Int. Cl.
*G06K 9/00* (2006.01)
*H04N 1/00* (2006.01)
*H04N 1/32* (2006.01)
*H04N 1/44* (2006.01)
*G06Q 30/00* (2012.01)
*G06F 21/30* (2013.01)

(56) References Cited

U.S. PATENT DOCUMENTS

| | | | |
|---|---|---|---|
| 2009/0044254 A1* | 2/2009 | Tian | G06Q 10/06 726/4 |
| 2016/0125231 A1* | 5/2016 | Stoyanov | G06K 9/00288 382/116 |
| 2016/0182741 A1* | 6/2016 | Takei | H04N 1/0044 358/1.6 |
| 2016/0253127 A1* | 9/2016 | Panda | G06F 3/1204 358/1.15 |
| 2016/0321830 A1* | 11/2016 | Cvetkovic | G06T 11/60 |
| 2016/0342752 A1* | 11/2016 | Stueckemann | G06F 19/328 |

* cited by examiner

34a Authentication information

| IC card information | Login username | Password |
|---|---|---|
| ○○○○○○ | USER001 | XXXXXXXX |
| ⋮ | ⋮ | ⋮ |

FIG. 6

34b User information

| Login username | Department | Employee No. |
|---|---|---|
| USER001 | KDJ General affairs | 1234567 |
| ⋮ | ⋮ | ⋮ |

FIG. 7

IMAGE FORMING APPARATUS AND SOCIAL SECURITY NUMBER REGISTRATION SYSTEM

INCORPORATION BY REFERENCE

The present application claims priority under 35 U.S.C. § 119 to Japanese Patent Application No. 2016-61305, filed Mar. 25, 2016. The contents of this application are incorporated herein by reference in their entirety.

BACKGROUND

The present disclosure relates to an image forming apparatus and a social security number registration system that collect specific information including characters representing a value for a specific item indicated in a specific document.

A typical image forming apparatus that collects specific information including characters representing a value for a specific item indicated in a specific document has been known that collects characters indicated in a data recording carrier and identification data capable of being read from the data recording carrier through wireless communication.

SUMMARY

An image forming apparatus according to the present disclosure includes a reading device that reads an image from a document, a storage device, and a central processing unit (CPU). The storage device stores therein an authentication kit, a scan extension kit, and a specific information collection program. The authentication kit is a program for user authentication of a user. The scan extension kit is a program for character recognition on the image that the reading device reads from the document. The specific information collection program is an application for collecting specific information of a user. The CPU executes the authentication kit to function as an authentication unit. The CPU executes the scan extension kit to function as a character recognition unit. The CPU executes the specific information collection program to function as a specific information collection unit. The specific information collection unit acquires information of the user for which authentication by the authentication kit passes from a user information management system that manages the information of the user. The specific information includes a character that represents a value of a specific item indicated in a specific document as the document and that is recognized by the character recognition unit and the information of the user acquired from the user information management system.

A social security number registration system according to the present disclosure includes and image forming apparatus, an authentication server that performs user authentication of a user, and a specific information processing server that processes specific information. The image forming apparatus includes a reading device that reads an image from a document, a storage device, and a central processing unit (CPU). The storage device stores therein an authentication kit, a scan extension kit, a specific information collection program, and a data security kit. The authentication kit is a program for user authentication of a user. The scan extension kit is a program for character recognition on the image that the reading device reads from the document. The specific information collection program is an application for collecting specific information of the user. The data security kit is a program for information encoding and decoding. The CPU executes the authentication kit to function as an authentication unit. The CPU executes the scan extension kit to function as a character recognition unit. The CPU executes the specific information collection program to function as a specific information collection unit. The CPU executed the data security kit to function as an encoding and decoding unit. The specific information collection unit acquires information of the user for which authentication by the authentication unit passes from the authentication server. The specific information includes a character that represents a value of a specific item indicated in a specific document as the document and that is recognized by the character recognition unit and the information acquired from the user information management system. The specific information collection unit causes the encoding and decoding unit to encode the specific information and stores the encoded specific information to the storage device. The specific information collection unit causes the encoding and decoding unit to decode the encoded specific information stored in the storage device and outputs the decoded specific information to the specific information processing server.

BRIEF DESCRIPTION OF THE DRAWINGS

FIG. 6 indicates an example of authentication information indicated in FIG. 5.

FIG. 7 indicates an example of user information indicated in FIG. 5.

DETAILED DESCRIPTION

The following describes an embodiment of the present disclosure with reference to the drawings.

With reference to FIGS. 1-3B, description will be made first about configuration of a social security number registration system according to the present embodiment.

Figure 1:
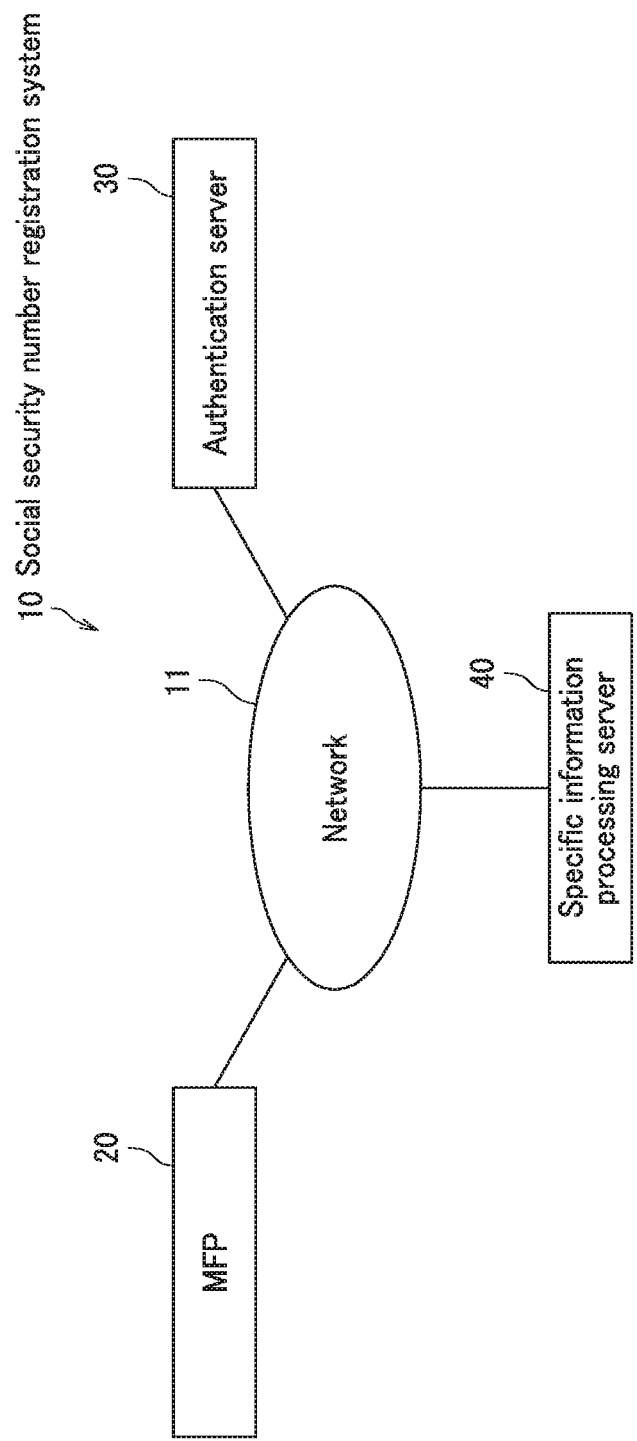
FIG. 1 is a block diagram of a social security number registration system according to an embodiment of the present disclosure.

FIG. 1 is a block diagram of a social security number registration system 10 according to the present embodiment.

As illustrated in FIG. 1, the social security number registration system 10 includes a multifunction peripheral (MFP) 20 that is an image forming apparatus, an authentication server 30 that performs user authentication of a user, and a specific information processing server 40 that processes specific information pertaining to a social security number (also referred to below as "specific information"). The MFP 20, the authentication server 30, and the specific information processing server 40 are connected together via a network 11 such as a local area network (LAN) or the Internet in a communicable manner. That is, the authentication server 30 and the specific information processing server 40 each are an external system for the MFP 20 that is connected to the MFP 20 via the network 11.

A social security number plan that a state specifies individual nationals has been being introduced in all over the world. Under the circumstances, companies are required in personnel, salary, and an accounting system to collect specific individual information that is individual information including individual numbers of employees, namely, specific information. The social security number registration system 10 is a system built in a company for collecting specific information of employees of the company.

Figure 2:
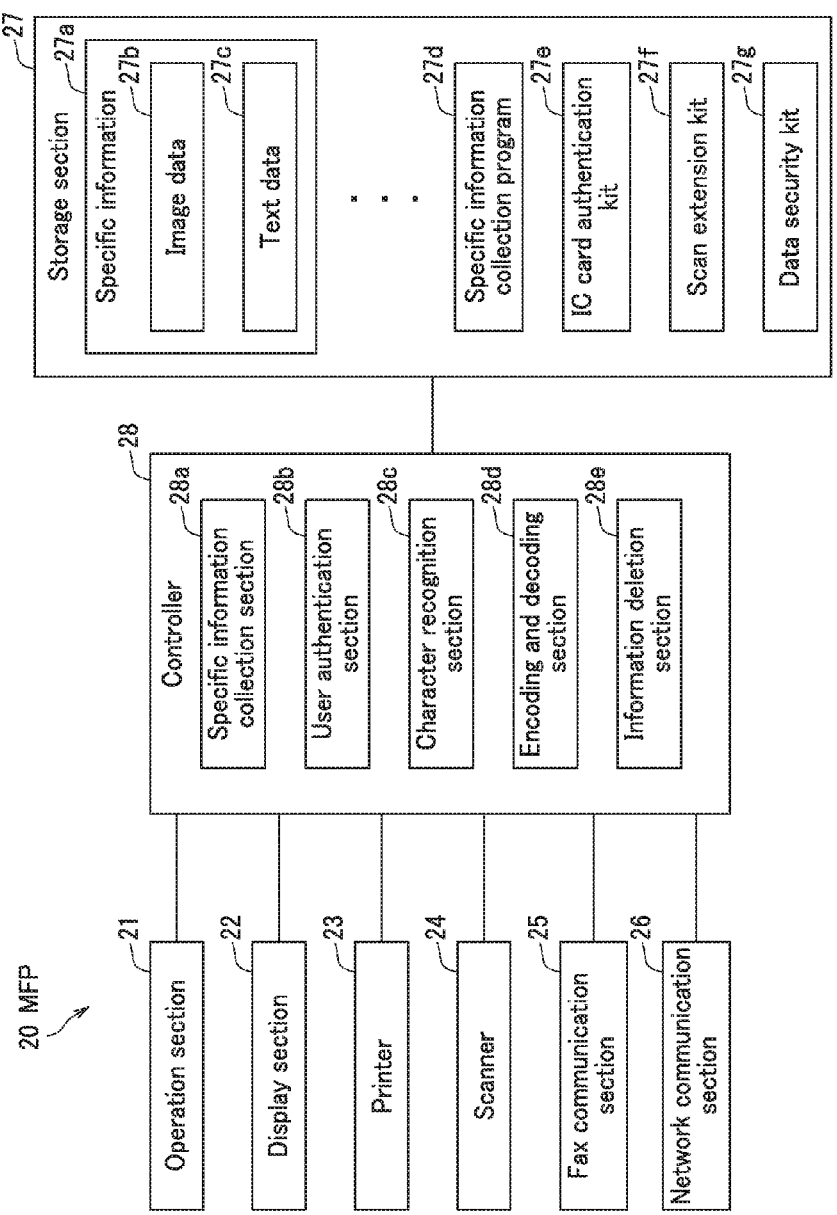
FIG. 2 is a block diagram of a multifunction peripheral (MFP) illustrated in FIG. 1.

FIG. 2 is a block diagram of the MFP 20.

As illustrated in FIG. 2, the MFP 20 includes an operation section 21, a display section 22, a printer 23, a scanner 24, a fax communication section 25, a network communication section 26, a storage section 27 that is a storage device, and a controller 28 that performs overall control of the MFP 20. The operation section 21 is an input device to which various types of operations are input, such as a button. The display section 22 is a display device that displays various types of information, such as a liquid crystal display (LCD). The printer 23 is a printing device that performs printing on a recording medium such as paper. The scanner 24 is a reading device that reads an image from a document. The fax communication section 25 is a facsimile machine that performs fax communication with an external facsimile machine, not illustrated, via a communication line such as a public telephone line. The network communication section 26 is a network communication device that performs communication with an external device via the network 11 (see FIG. 1). The storage section 27 is a storage device that stores therein various types of information, such as a semiconductor memory or a hard disk drive (HDD).

The storage section 27 is capable of storing therein specific information 27a on a user-by-user basis. The specific information 27a includes image data 27b of a document and text data 27c including characters acquired from the document.

Figures 3A, 3B:
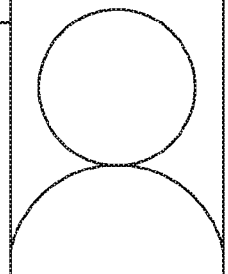
FIG. 3A illustrates an example of an image of a social security number notification card included in image data indicated in FIG. 2.
FIG. 3B illustrates an example of an image of a driver's license card included in the image data indicated in FIG. 2.

FIG. 3A illustrates an example of an image of a social security number notification card. FIG. 3B illustrates an example of an image of a driver's license card. The image data 27b includes the image of the social security number notification card as illustrated in FIG. 3A. The image data 27b further includes the image of the driver's license card as illustrated in FIG. 3B. The social security number notification card and the driver's license card each are a specific document.

Figure 4:
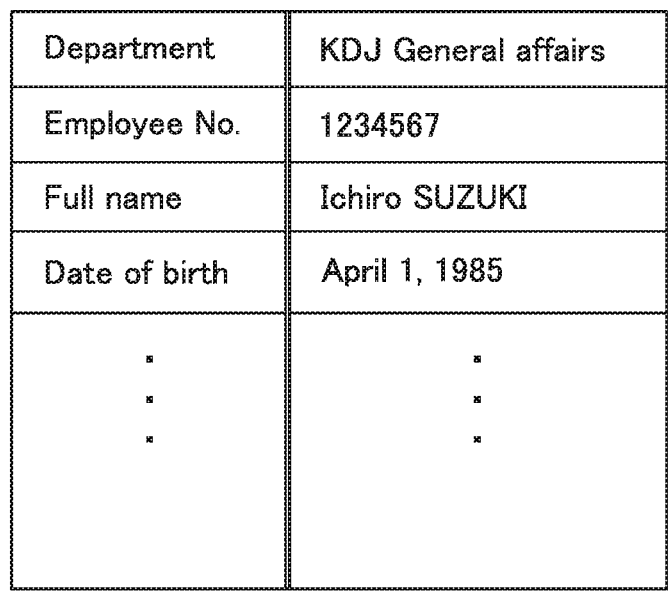
FIG. 4 illustrates an example of text data indicated in FIG. 2.

FIG. 4 illustrates an example of the text data 27c.

As illustrated in FIG. 4, examples of items included in the text data 27c includes "Department", "Employee number", "Full name", and "Date of birth". "Department" represents a department in the company to which a user belongs. "Employee number" represents an employee number of the user in the company. "Full name" represents a full name of the user. "Date of birth" represents the date of user's birth.

As illustrated in FIG. 2, the storage section 27 stores therein a specific information collection program 27d, an integrated circuit (IC) card authentication kit 27e, a scan extension kit 27f, and a data security kit 27g. The specific information collection program 27d is a program for collecting specific information. The IC card authentication kit 27e (authentication kit) is a program for executing authentication of a user using an IC card. The scan extension kit 27f is a program for executing character recognition on an image that the scanner 24 reads from a document, that is, optical character recognition (OCR) conversion. The data security kit 27g is a program for performing a security measure such as information encoding and decoding. The specific information collection program 27d, the IC card authentication kit 27e, the scan extension kit 27f, and the data security kit 27g may be installed in the MFP 20 in a production stage of the MFP 20, later from an external storage medium such as a universal serial bus (USB) memory, or later through the network 11.

The specific information collection program 27d is a Java application that operates on a Java platform not illustrated. The Java platform provides an application programming interface (API) for the IC card authentication kit 27e, the scan extension kit 27f, and the data security kit 27g to the specific information collection program 27d.

The controller 28 includes for example a central processing unit (CPU), a read only memory (ROM) that stores therein programs and various types of data, and a random access memory (RAM) for use as a work area of the CPU. The CPU executes programs stored in the storage section 27 or the ROM.

The controller 28 executes the specific information collection program 27d stored in the storage section 27 to function as a specific information collection section 28a (specific information collection unit) that collects specific information of a user.

The controller 28 executes the IC card authentication kit 27e stored in the storage section 27 to function as a user authentication section 28b (authentication unit) that performs user authentication of the user.

The controller 28 executes the scan extension kit 27f stored in the storage section 27 to function as a character recognition section 28c (character recognition unit) that performs character recognition on an image that the scanner 24 reads from a document.

The controller 28 executes the data security kit 27g stored in the storage section 27 to function as an encoding and decoding section 28d (encoding and decoding unit) that performs information encoding and decoding and an information deletion section 28e that completely deletes certain information from the storage section 27.

Figure 5:
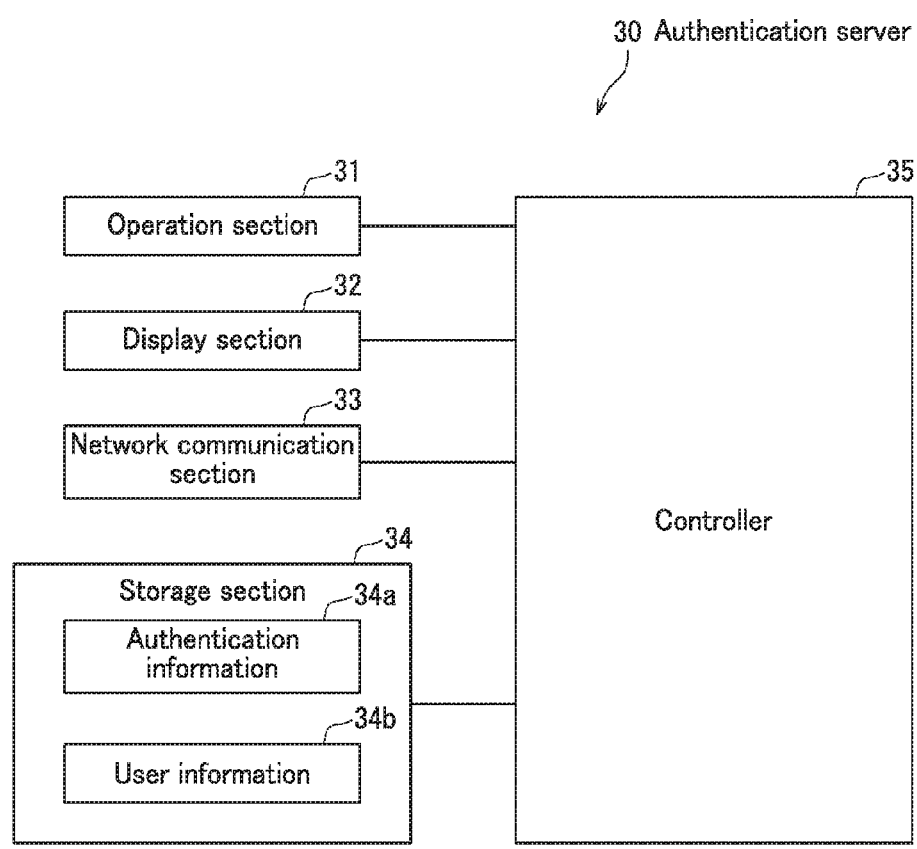
FIG. 5 is a block diagram of an authentication server illustrated in FIG. 1.

FIG. 5 is a block diagram of the authentication server 30.

As illustrated in FIG. 5, the authentication server 30 includes an operation section 31, a display section 32, a network communication section 33, a storage section 34, and a controller 35 that performs overall control of the authentication server 30. The operation section 31 is an input device to which various types of user operations are input, such as a mouse or a keyboard. The display section 32 is a display device that displays various types of information, such as a LCD. The network communication section 33 is a network communication device that performs communication with an external device via the network 11 (see FIG. 1). The storage section 34 is a storage device that stores therein various types of data, such as a semiconductor memory or a HDD. The authentication server 30 is constituted by a computer such as a personal computer.

The storage section 34 stores therein authentication information 34a for use in user authentication.

The storage section 34 stores therein information of the user (also referred to below as user information) 34b. The authentication server 30 accordingly constitutes a user information management system that manages the user information 34b.

The controller 35 includes for example a CPU, a ROM that stores therein programs and various types of data, and a RAM for use as a work area of the CPU. The CPU executes programs stored in the ROM or the storage section 34.

FIG. 6 illustrates an example of the authentication information 34a.

As indicated in FIG. 6, examples of items included in the authentication information 34a include "IC card information", "Login username", and "Password". "IC card information", "Login username", and "Password" are associated with one another on a user-by-user basis. "IC card information" represents IC card information registered in an IC card. "Login username" represents a login username that is identification information of a login user. "Password" represents a password that the user uses for login.

FIG. 7 illustrates an example of the user information 34b.

As illustrated in FIG. 7, examples of items included in the user information 34b include "Login username", "Department", and "Employee number". Values for the respective items are associated with one another on a user-by-user basis in the user information 34b. "Login username" represents a login username that is identification information of a login user. "Department" represents a department in the company to which the user belongs. "Employee number" represents an employee number of the user in the company.

Figure 8:
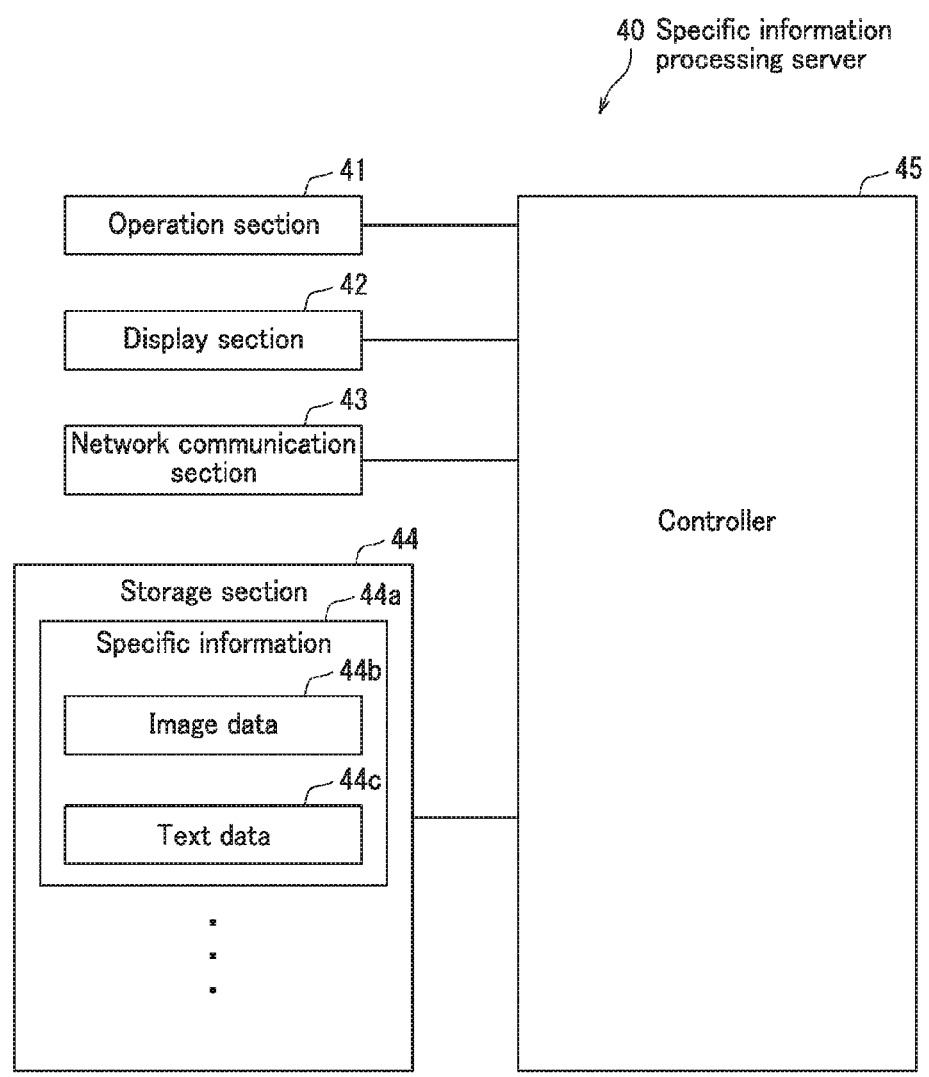
FIG. 8 is a block diagram of a specific information processing server illustrated in FIG. 1.

FIG. 8 is a block diagram of the specific information processing server 40.

As illustrated in FIG. 8, the specific information processing server 40 includes an operation section 41, a display section 42, a network communication section 43, a storage section 44, and a controller 45. The specific information processing server 40 is constituted by a computer such as a PC. The operation section 41 is an input device to which various types of user operations are input, such as a mouse or a keyboard. The display section 42 is a display device that displays various types of information, such as a LCD. The network communication section 43 is a network communication device that performs communication with an external device via the network 11 (see FIG. 1). The storage section 44 is a storage device that stores therein various types of data, such as a semiconductor memory or a HDD. The controller 45 performs overall control of the specific information processing server 40.

The storage section 44 is capable of storing therein specific information 44a on a user-by-user basis. The specific information 44a includes image data 44b of a document and text data 44c including characters acquired from the document.

The controller 45 includes for example a CPU, a ROM that stores therein programs and various types of data, a RAM for use as a work area of the CPU. The CPU executes programs stored in the ROM or the storage section 44.

Operation of the social security number registration system 10 will be described next.

Description will be made first with reference to FIG. 9 about operation of the social security number registration system 10 that is performed for user login.

Figure 9:
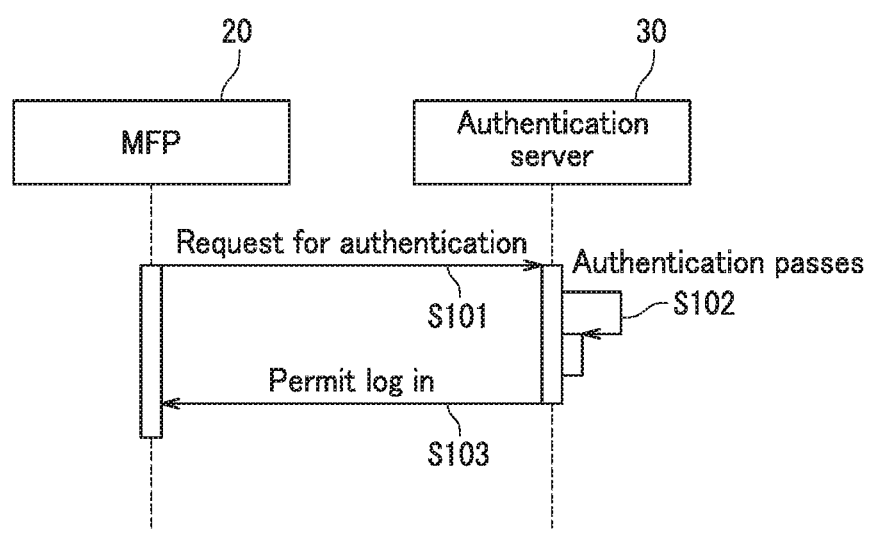
FIG. 9 is a sequence diagram of operation of the social security number registration system illustrated in FIG. 1 that is performed for user login.

FIG. 9 is a sequence diagram of the operation of the social security number registration system 10 that is performed for user login.

Upon receipt of information for authentication of a user, the user authentication section 28b of the MFP 20 makes a request to the authentication server 30 for user authentication by transmitting the received information to the authentication server 30 (S101), as illustrated in FIG. 9. The information for authentication of the user herein is for example any combination of IC card information, a login username, and a password. The IC card information is input to the MFP 20 from an IC card of the user through an IC card reader not illustrated. A combination of a login username and a password of the user are input through the operation section 21.

In response to the request, the controller 35 of the authentication server 30 determines whether or not the information transmitted from the MFP 20 at S101 includes authentication information 34a of the user (S102). When it is determined that the information transmitted from the MFP 20 includes the authentication information 34a of the user, the controller 35 transmits a login username of the user by return to permit the user to log in (S103).

Description will be made next with reference to FIGS. 10A and 10B about operation of the MFP 20 that is performed in specific information collection.

Figure 10A:
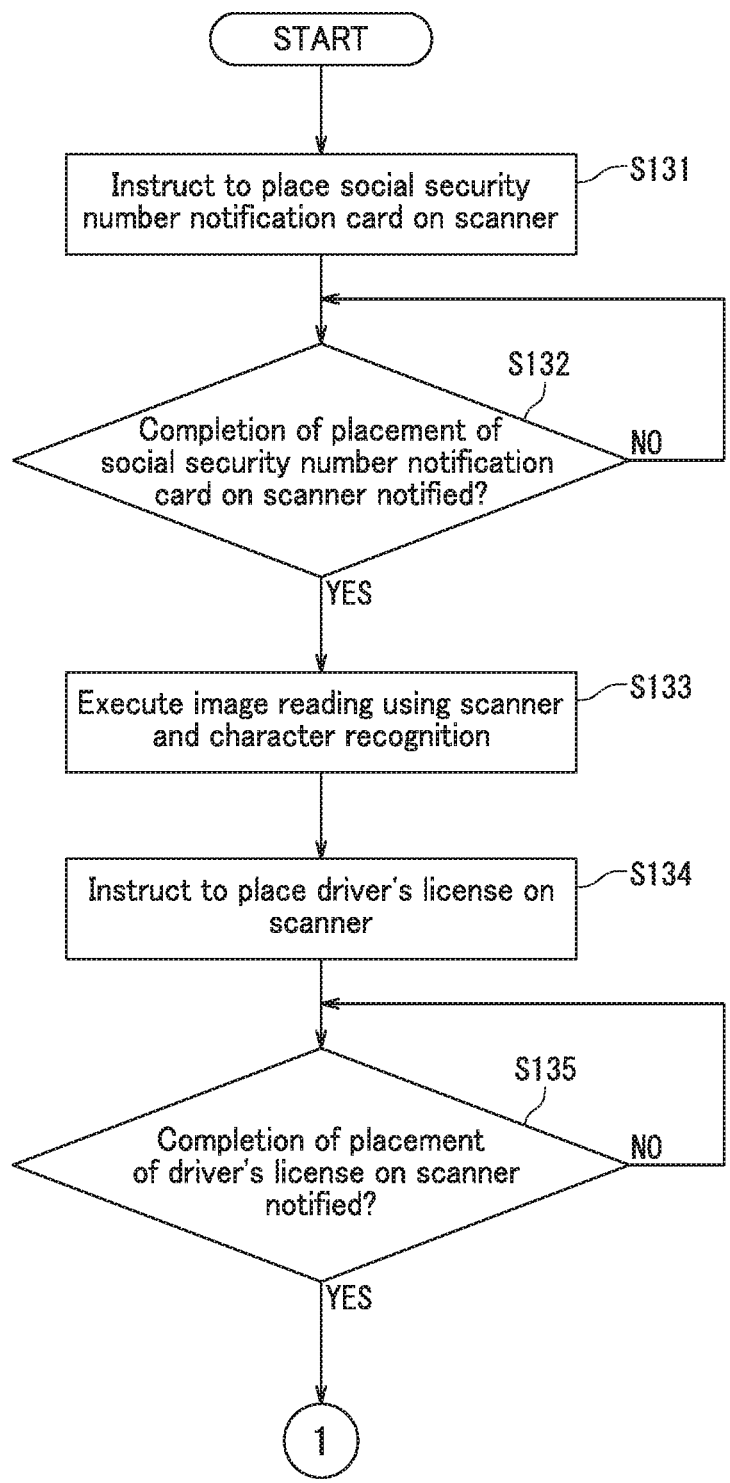
FIG. 10A is a flowchart depicting a former half of operation of the MFP indicated in FIG. 2 that is performed in specific information collection.

FIG. 10A is a flowchart depicting a former half of the operation of the MFP that is performed in specific information collection. FIG. 10B is a flowchart depicting a latter half of the operation of the MFP 2 that is performed in specific information collection.

When specific information collection is instructed through the operation section 21 of the MFP 20, the specific information collection section 28a instructs the user to place a social security number notification card on the scanner 24 though the display section 22 as depicted in FIG. 10A (S131). Thereafter, the specific information collection section 28a determines whether or not completion of placement of the social security number notification card on the scanner 24 is notified of by the user through the operation section 21 (S132) until the specific information collection section 28a determines that completion of placement of the social security number notification card on the scanner 24 is notified of by the user through the operation section 21 (YES at S132). That is, the specific information collection section 28a re-executes the processing at S132 as long as completion of placement of the social security number notification card on the scanner 24 is not notified of by the user through the operation section 21 (NO at S132). The user who has completed placement of the social security number notification card on the scanner 24 can notify the MFP 20 of completion of placement of the social security number notification card on the scanner 24 using the operation section 21.

Upon determining at S132 that completion of the social security number notification card that is a specific document is notified of by the user through the operation section 21 (YES at S132), the specific information collection section 28a executes image reading from the specific document using the scanner 24 and character recognition on an image that the scanner 24 reads from the specific document (S133). Specifically, the specific information collection section 28a instructs the character recognition section 28c to perform image reading from the specific document using the scanner

24 and character recognition on an image that the scanner 24 reads from the document. In response to the instruction, the character recognition section 28c causes the scanner 24 to read an image from the specific document and recognizes characters in the image that the scanner 24 reads from the specific document.

Once character recognition by the character recognition section 28c is complete in the processing at S133, the specific information collection section 28a instructs the user to place a driver's license card of the user on the scanner 24 though the display section 22 (S134). Thereafter, the specific information collection section 28a determines whether or not completion of placement of the driver's license card on the scanner 24 is notified of by the user through the operation section 21 (S135) until the specific information collection section 28a determines that completion of placement of the driver's license card on the scanner 24 is notified of by the user through the operation section 21 (YES at S135). The user who has completed placement of the driver's license card on the scanner 24 can notify the MFP 20 of completion of placement of the driver's license card on the scanner 24 using the operation section 21.

Upon determining at S135 that completion of placement of the driver's license card that is a specific document on the scanner 24 is notified of by the user through the operation section 21 (YES at S135), the specific information collection section 28a executes image reading from the specific document using the scanner 24 and character recognition on an image that the scanner 24 reads from the specific document (S136). Specifically, the specific information collection section 28a instructs the character recognition section 28c to perform image reading from the specific document using the scanner 24 and character recognition on an image that the scanner 24 reads from the specific document. In response to the instruction, the character recognition section 28c causes the scanner 24 to read an image from the document and recognizes characters in the image that the scanner 24 reads from the specific document.

Once character recognition by the character recognition section 28c is complete in the processing at S136, the specific information collection section 28a acquires user information of the login user from the authentication server 30 (S137). Specifically, the specific information collection section 28a makes a request to the authentication server 30 for transmission of the user information of the login user by transmitting a login username of the login user to the authentication server 30. In response to the request, the controller 35 of the authentication server 30 transmits by return to the MFP 20 the user information 34b associated with the login username transmitted from the MFP 20.

Upon receipt of the user information from the authentication server 30 in the processing at S137, the specific information collection section 28a generates specific information for the login user on the RAM of the controller 28 (S138). Here, the specific information collection section 28a sets the image that the scanner 24 reads at S133 as an image of the social security number notification card among image data included in the specific information. Similarly, the specific information collection section 28a sets the image that the scanner 24 reads at S136 as an image of the driver's license card among the image data included in the specific information. The specific information collection section 28a further generates text data of the specific information based on the characters recognized by the character recognition section 28c at S133, the characters recognized by the character recognition section 28c at S136, and the user information acquired at S137. For example, the specific information collection section 28a is capable of extracting a value located after an item name such as "Full name" among the characters recognized by the character recognition section 28c through detection of the item name. The specific information collection section 28a extracts a character string located after "Full name", which is an item name, as a name of the user.

After the processing at S138, the specific information collection section 28a causes the encoding and decoding section 28d to encode the specific information generated at S138 (S139). Thereafter, the specific information collection section 28a stores the specific information 27a encoded at S139 to the storage section 27 as the specific information 27a of the login user (S140).

Detailed description will be made next with reference to FIG. 11 about operation of the MFP 20 in execution of image reading from a document using the scanner 24 and character recognition on an image that the scanner 24 reads from the document at S133 and S136.

Figure 11:
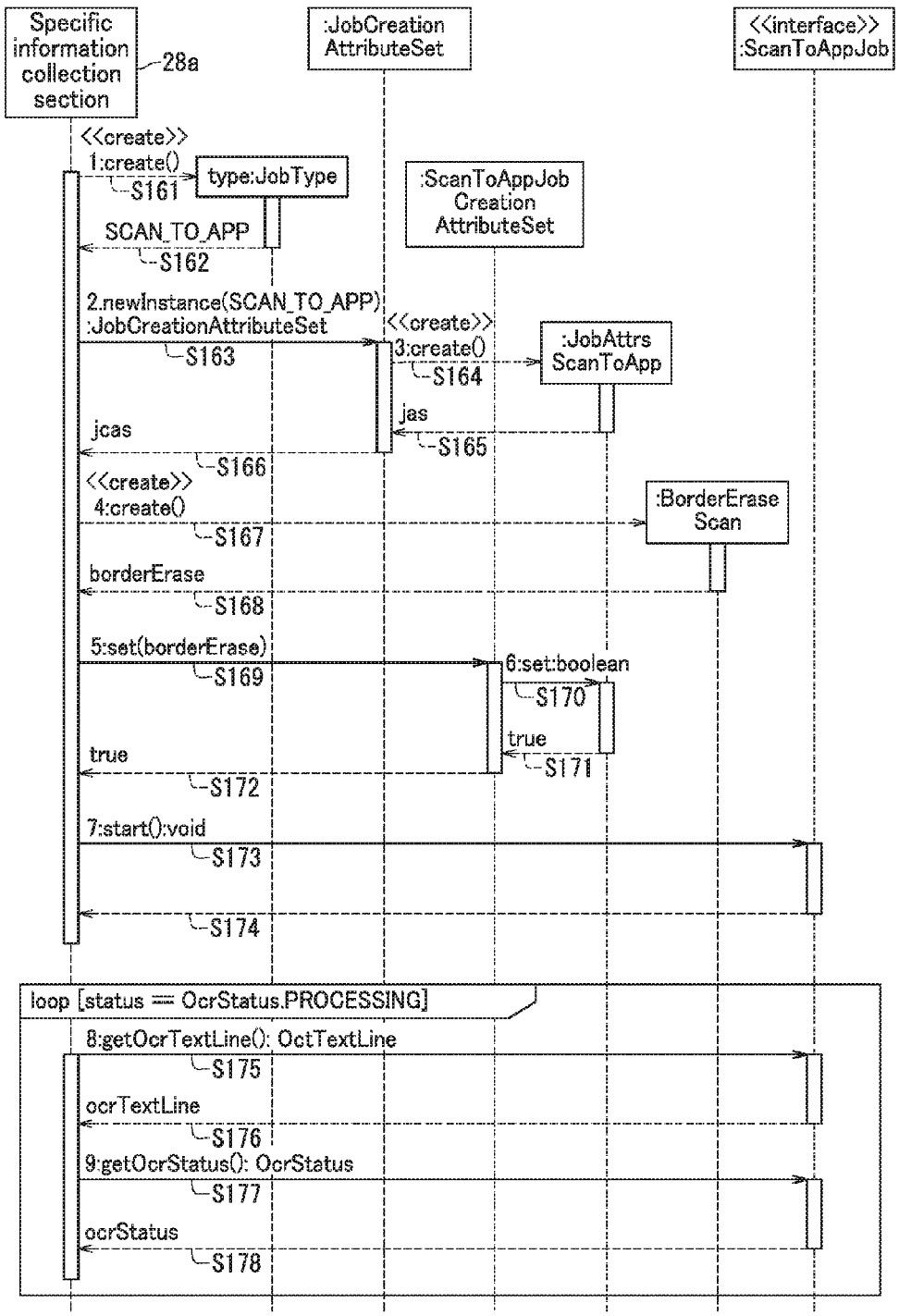
FIG. 11 is a sequence diagram of operation of the MFP indicated in FIG. 2 that is performed in execution of image reading from a document using a scanner and character recognition on an image that the scanner reads from the document.

FIG. 11 is a sequence diagram illustrating the operation of the MFP 20 that is performed in execution of image reading from a document using the scanner 24 and character recognition on an image that the scanner 24 reads from the document at S133 and S136.

Referring to FIG. 11, "type:JobType", ":JobCreationAttributeSet", ":ScanToAppJobCreationAttributeSet", ":JobAttrsScanToApp", ":BorderEraseScan", and "<<interface>>:ScanToAppJob" each are an API for the scan extension kit 27f that the aforementioned Java platform provides to the specific information collection program 27d.

Processing at S161 and S162 is processing by the specific information collection section 28a to create a job type of a present job. "SCAN_TO_APP" represents a job type of a job of executing image reading from a document using the scanner 24 and character recognition on an image that the scanner 24 reads from the document.

Processing at S163 to S166 is processing by the specific information collection section 28a to create a setting format for the job of which type is created at S161 and S162.

Processing at S167 and S168 is processing by the specific information collection section 28a to create a setting item "BorderErase" based on the setting format created at S163 to S166. "BorderErase" is a specific setting item to erase a border in the image in OCR.

Processing at S169 to S172 is processing by the specific information collection section 28a to set a specific value for the setting item "BorderErase" created at S167 and S168.

Note that S167 to S172 indicate setting of the setting item "BorderErase". However, the specific information collection section 28a can set various setting items and values thereof for the present job based on the setting format created at S163 to S166" in addition to the setting item "BorderErase".

Processing at S173 and S174 is processing by the specific information collection section 28a to start the present job. Processing according to the setting value set up to S173 is executed for the present job.

Processing at S175 to S178 is processing by the specific information collection section 28a to acquire characters from OCR data on a line-by-line basis until the processing reaches the last character in the OCR data from job start at S173 and S174.

Description will be made next with reference to FIG. 12 about operation of the MFP 20 that is performed in transmission of specific information to the specific information processing server 40.

Figure 12:
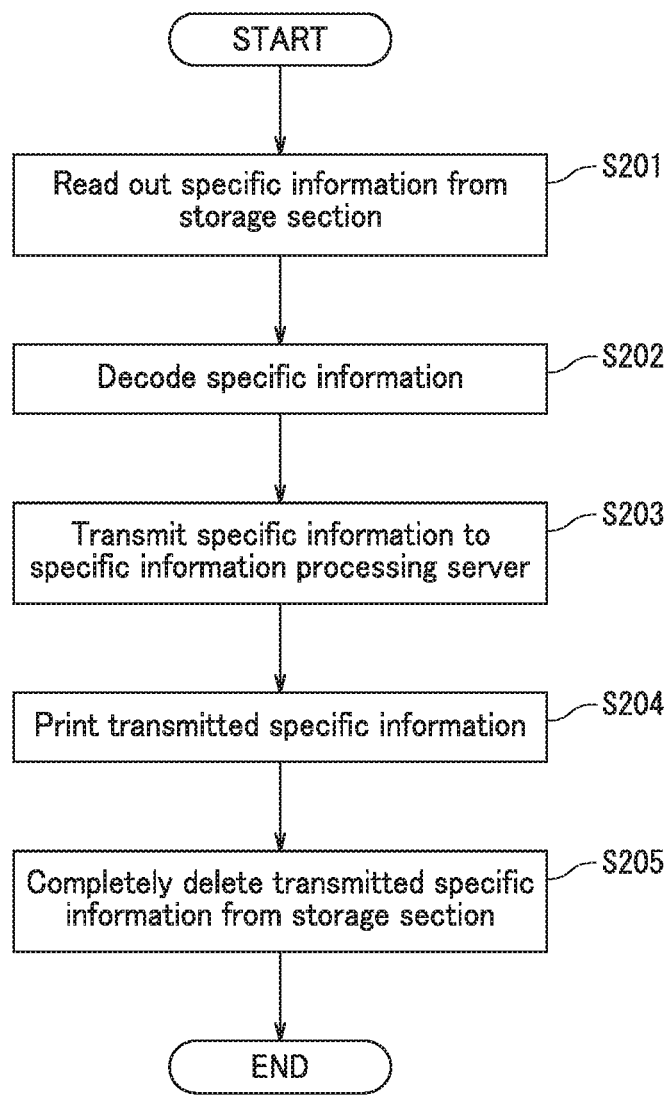
FIG. 12 is a flowchart depicting operation of the MFP indicated in FIG. 2 that is performed in transmission of the specific information to the specific information processing server.

FIG. 12 is a flowchart depicting the operation of the MFP 20 that is performed in transmission of the specific information to the specific information processing server 40.

As depicted in FIG. 12, the specific information collection section 28a of the MFP 20 reads out specific information 27a of a login user from the storage section 27 (S201). Thereafter, the specific information collection section 28a causes the encoding and decoding section 28d to decode the specific information 27a read out at S201 (S202). The specific information collection section 28a then transmits the specific information decoded at S202 to a specific folder that the specific information processing server 40 has (S203). In response, the controller 45 of the specific information processing server 40 stores the specific information 27a received from the MFP 20 to the specific folder of the storage section 44 as specific information 44a.

In a configuration for example in which the specific information processing server 40 has a common folder as the specific folder to which the specific information 27a is transmitted at S203, the specific information 27a can be shared among users who are permitted to access the common folder.

In an alternate configuration in which the specific information processing server 40 has a folder to be transferred by the specific information processing server 40 via an email as the specific folder to which the specific information 27a is transmitted at S203, the specific information processing server 40 transmits the specific information 27a written in the folder to a specific email address.

In a still alternate configuration in which the specific information processing server 40 has a folder to be input to a specific workflow system such as a workflow system that executes document examination from the specific information processing server 40 as the specific folder to which the specific information 27a is transmitted at S203 is a folder, the specific information processing server 40 inputs the specific information 27a written in the folder to the specific workflow system.

In a yet alternate configuration in which the specific folder of the specific information processing server 40 to which the specific information 27a is transmitted at S203 is a folder to be output to a specific cloud service from the specific information processing server 40, the specific information processing server 40 outputs the specific information 27a written in the folder to the specific cloud service.

Figure 13:
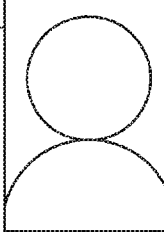
FIG. 13 illustrates an example of printed paper printed in the operation depicted in FIG. 12.

The specific information collection section 28a after the processing at S203 causes the printer 23 to print the specific information 27a transmitted at S203 as illustrated in FIG. 13 (S204). In the above configuration, a user can check the content of the specific information 27a, which the MFP 20 transmits, by checking printed paper printed at S204.

Next, the specific information collection section 28a causes the information deletion section 28e to completely delete the specific information 27a read out from the storage section 27 at S201 from the storage section 27 (S205). The specific information collection section 28a then terminates the operation depicted in FIG. 12.

As has been described so far, the MFP 20 collects the specific information that includes the characters that represent a value for the specific item indicated in the document and that is recognized in character recognition, and the information acquired from the authentication server 30 as the user information. In the above configuration, the MFP 20 can collect, in association with each other, the characters representing the value for the specific item indicated in the document, which is information included in the document, and the information acquired from the authentication server 30, which is information not included in the document.

Use of the MFP 20, which is capable of collecting the specific information 27a including the image data 27b of the document and the text data 27c including characters acquired from the document, can achieve efficient management and handling of social security numbers in a company.

The MFP 20 is disabled to output the specific information 27a outside the MFP 20 until collection of the specific information 27a is complete. In the above configuration, a possibility of leakage of the specific information 27a can be reduced.

The MFP 20 is capable of transmitting the specific information 27a to the specific information processing server 40 in a manner to respond to a request from the specific information processing server 40. In the above configuration, the social security number registration system 10 need not include an additional server such as a server for converting the specific information 27a to information in the form that the specific information processing server 40 requests. As a result, maintenance cost of the social security number registration system 10 can be reduced.

The authentication server 30 in the present embodiment corresponds to a user information management system. That is, the MFP 20 does not include the user information management system. In the above configuration, hardware performance necessary for implementing the MFP 20 can be moderated. However, the MFP 20 may include the user information management system.

The MFP 20 stores the encoded specific information 27a to the storage section 27 (S140) only after the specific information 27a is encoded (S139). In the above configuration, a possibility of illegal access to the specific information 27a in the storage section 27 can be reduced. However, the MFP 20 may not execute encoding of the specific information 27a.

When the MFP 20 outputs the specific information 27a stored in the storage section 27 outside the MFP 20 (to the specific information processing server 40) at S203, the MFP 20 completely deletes from the storage section 27 the specific information 27a output outside (S205). In the above configuration, a possibility of illegal access to the specific information 27a in the storage section 27 can be reduced. However, the MFP 20 may not execute complete deletion of the specific information 27a.

Note that the specific information collection section 28a may perform the operation depicted in FIG. 12 subsequently to the operation depicted in FIG. 10 at all times. In a configuration in which the specific information collection section 28a performs the operation depicted in FIG. 12 subsequently to the operation depicted in FIG. 10, the specific information collection section 28a may not store the specific information 27a to the storage section 27 from the RAM of the controller 28.

The specific information collection section 28a may cause the character recognition section 28c to perform character recognition only on a specific region of a document at S133 and/or S136. In a configuration in which character recognition is performed only on the specific region of the document, efficient character recognition can be performed in the MFP 20. For example, time taken for character recognition per one document can be reduced. The specific information collection section 28a can receive a region of a document on which the character recognition section 28c is to perform character recognition for example through the operation section 21.

Figure 10B:
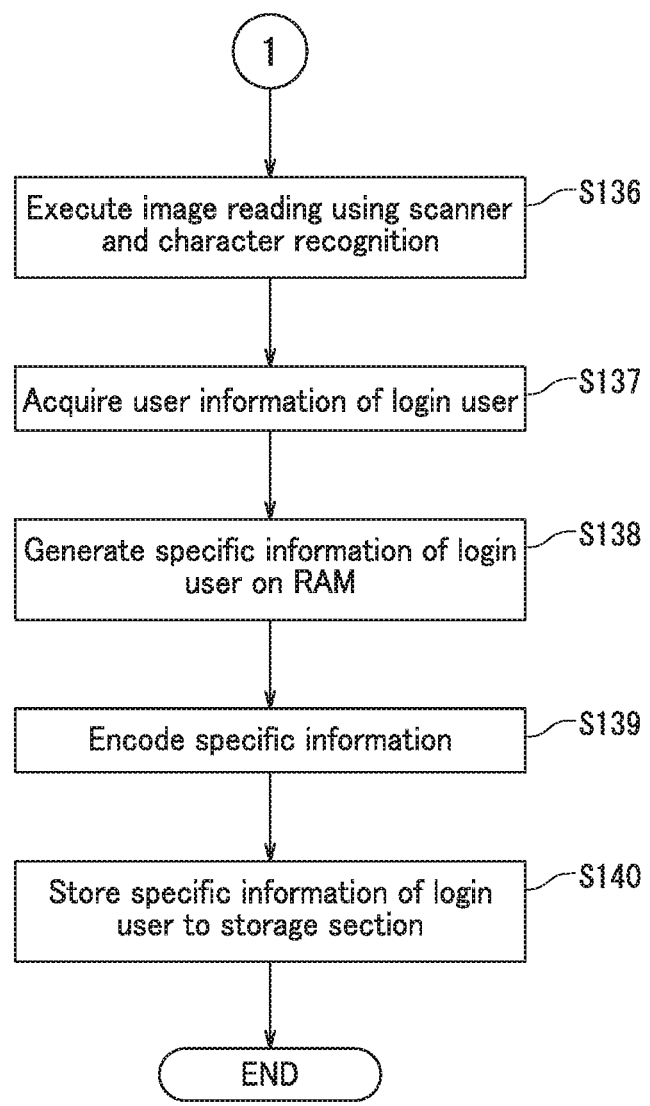
FIG. 10B is a flowchart depicting a latter half of the operation of the MFP indicated in FIG. 2 that is performed in specific information collection.

The specific information collection section 28a may store an execution log of the operation depicted in FIGS. 10A and 10B and the operation depicted in FIG. 12 to the storage section 27. When a person who has no access right illegally executes the operation depicted in FIGS. 10A and 10B and the operation depicted in FIG. 12 in a configuration in which the execution log of these operations are stored in the storage section 27, the specific information collection section 28a can cause an administrator to find such illegal execution based on the execution log.

The image forming apparatus according to the present disclosure is the MFP in the present embodiment but may be an image forming apparatus other than the MFP, such as an apparatus that performs canning.

What is claimed is:

1. An image forming apparatus comprising:
   a reading device configured to read an image from a document;
   a printing device configured to execute printing on a recording medium;
   a storage device; and
   a central processing unit (CPU),
   wherein the image forming apparatus is connected via a network to an authentication server that executes user authentication of a user and a specific information processing server that processes specific information pertaining to a social security number,
   the storage device stores therein:
     (1) an authentication kit that is a program for user authentication of the user;
     (2) a scan extension kit that is a program for character recognition on the image that the reading device reads from the document;
     (3) a data security kit that is a program for encoding and decoding information; and
     (4) a specific information collection program that is a Java application for collecting the specific information of the user,
   the Java application operates on a Java platform, the Java platform providing an application programming interface for the authentication kit, an application programming interface for the scan extension kit, and an application programming interface for the data security kit to the specific information collection program,
   the CPU executes:
     (1) the authentication kit to function as an authentication unit;
     (2) the scan extension kit to function as a character recognition unit;
     (3) the data security kit to function as an encoding and decoding unit and an information deletion unit; and
     (4) the specific information collection program to function as a specific information collection unit,
   the authentication unit makes a request to the authentication server for the user authentication of the user, and
   the specific information collection unit
     (1) causes the reading device to read an image of a specific document as the document,
     (2) causes the character recognition unit to perform recognition on characters included in the image of the specific document,
     (3) acquires from the authentication server information of the user for which authentication by the authentication unit passes;
     (4) generates the specific information of the user, the specific information including image data and text data, the image data including the image of the specific document, the text data including both a character and the information of the user, the character representing a value of a specific item indicated in the specific document and being recognized by the character recognition unit, the information of the user being acquired from the authentication server,
     (5) causes the encoding and decoding unit to encode the generated specific information of the user and stores the encoded specific information of the user in the storage device,
     (6) causes the encoding and decoding unit to decode the encoded specific information of the user stored in the storage device and transmits the decoded specific information to the specific information processing server,
     (7) causes the printing device to print the specific information of the user on the recording medium after transmission of the decoded specific information, and
     (8) causes the information deletion unit to completely delete the specific information of the user from the storage device.

2. The image forming apparatus according to claim 1, wherein
   the specific information collection unit causes the character recognition unit to perform the character recognition only on a specific region of the specific document.

3. The image forming apparatus according to claim 1, wherein
   the specific information collection unit:
     creates a job type of a job that the reading device is to execute;
     creates a setting format for the job;
     sets various setting items and values thereof for the job based on the setting format; and
     executes the job according to the setting items and the values thereof.

4. The image forming apparatus according to claim 1, wherein
   the specific information collection unit transmits the specific information of the user to the specific information processing server only after collection of the specific information of the user is complete.

5. The image forming apparatus according to claim 1, wherein
   the image of the specific document included in the image data includes an image of a social security number notification card or an image of a driver's license.

6. The image forming apparatus according to claim 1, wherein
   the specific item includes "Department" representing a department in a company to which a user belongs, "Employee number" representing an employee number of a user in the company, "Full name" representing a full name of a user, and "Date of birth" representing date of birth of a user.

7. A social security number registration system comprising:
   an image forming apparatus;
   an authentication server that performs user authentication of a user; and
   a specific information processing server that processes specific information pertaining to a social security number, and
   the image forming apparatus including:

a reading device configured to read an image from a document;

a printing device configured to execute printing on a recording medium;

a storage device; and a central processing unit (CPU), wherein the storage device stores therein:
- (1) an authentication kit that is a program for user authentication of the user;
- (2) a scan extension kit that is a program for character recognition on the image that the reading device reads from the document;
- (3) a specific information collection program that is a Java application for collecting the specific information of the user; and
- (4) a data security kit that is a program for information encoding and decoding, the Java application operates on a Java platform, the Java platform providing an application programming interface for the authentication kit, an application programming interface for the scan extension kit, and an application programming interface form the data security kit to the specific information collection program, the CPU executes:
- (1) the authentication kit to function as an authentication unit;
- (2) the scan extension kit to function as a character recognition unit;
- (3) the specific information collection program to function as a specific information collection unit; and
- (4) the data security kit to function as an encoding and decoding unit and an information deletion unit, the authentication unit makes a request to the authentication server for the user authentication of the user, and the specific information collection unit
- (1) causes the reading device to read an image of a specific document as the document,
- (2) causes the character recognition unit to perform recognition on characters included in the image of the specific document,
- (3) acquires from the authentication server information of the user for which authentication by the authentication unit passes;
- (4) generates the specific information of the user, the specific information including image data and text data, the image data including the image of the specific document, the text data including both a character and the information of the user, the character representing a value of a specific item indicated in the specific document and being recognized by the character recognition unit, the information of the user being acquired from the authentication server,
- (5) causes the encoding and decoding unit to encode the generated specific information of the user and causes the storage device to store the encoded specific information of the user,
- (6) causes the encoding and decoding unit to decode the encoded specific information of the user stored in the storage device and transmits the decoded specific information of the user to the specific information processing server,
- (7) causes the printing device to print the specific information of the user on the recording medium after transmission of the encoded specific information, and
- (8) causes the information deletion unit to completely delete the specific information of the user from the storage device.

8. The social security number registration system according to claim 7, wherein
the specific information collection unit causes the character recognition unit to perform the character recognition only on a specific region of the specific document.

9. The social security number registration system according to claim 7, wherein
the specific information collection unit
creates a job type of a job that the reading device is to execute;
creates a setting format for the job;
sets various setting items and values thereof for the job based on the setting format; and
executes the job according to the setting items and the values thereof.

10. The social security number registration system according to claim 7, wherein
the specific information collection unit transmits the specific information of the user to the specific information processing server only after collection of the specific information of the user is complete.

11. The social security number registration system according to claim 7, wherein
the image of the specific document included in the image data includes an image of a social security number notification card or an image of a driver's license.

12. The social security number registration system according to claim 7, wherein
the specific item includes "Department" representing a department in a company to which a user belongs, "Employee number" representing an employee number of a user in the company, "Full name" representing a full name of a user, and "Date of birth" representing date of birth of a user.

* * * * *